United States Patent [19]
Benedetti

[11] 3,750,320
[45] Aug. 7, 1973

[54] DEVICE FOR AUTOMATICALLY HOOKING A FISH

[76] Inventor: Napoleone Benedetti, Via Ghittoni 5, Piacenza, Italy

[22] Filed: Apr. 13, 1971

[21] Appl. No.: 133,585

[30] Foreign Application Priority Data
Apr. 15, 1970 Italy .............................. 23341 A/70

[52] U.S. Cl. .................................................. 43/15
[51] Int. Cl. ........................................... A01k 97/00
[58] Field of Search ........................................ 43/15

[56] References Cited
UNITED STATES PATENTS
2,689,426   9/1954   Baenen ................................. 43/15
3,451,155   6/1969   Huliew .................................. 43/15

Primary Examiner—Louis G. Mancene
Assistant Examiner—Daniel J. Leach
Attorney—Shlesinger, Fitzsimmons & Shlesinger

[57] ABSTRACT

A device for automatically hooking a fish comprising a ground-supported frame with a spring-biased rod pivotally secured at one end to the frame between a rest position and a cocked position. An arm is pivoted to the free end of the rod and a fishing line with a hook thereon is secured to the free end of the arm. The rod and arm are latched in the cocked position and are released from the latch means by a pull on the line, the spring biasing the rod to the rest position to set the hook in the fish's mouth.

7 Claims, 6 Drawing Figures

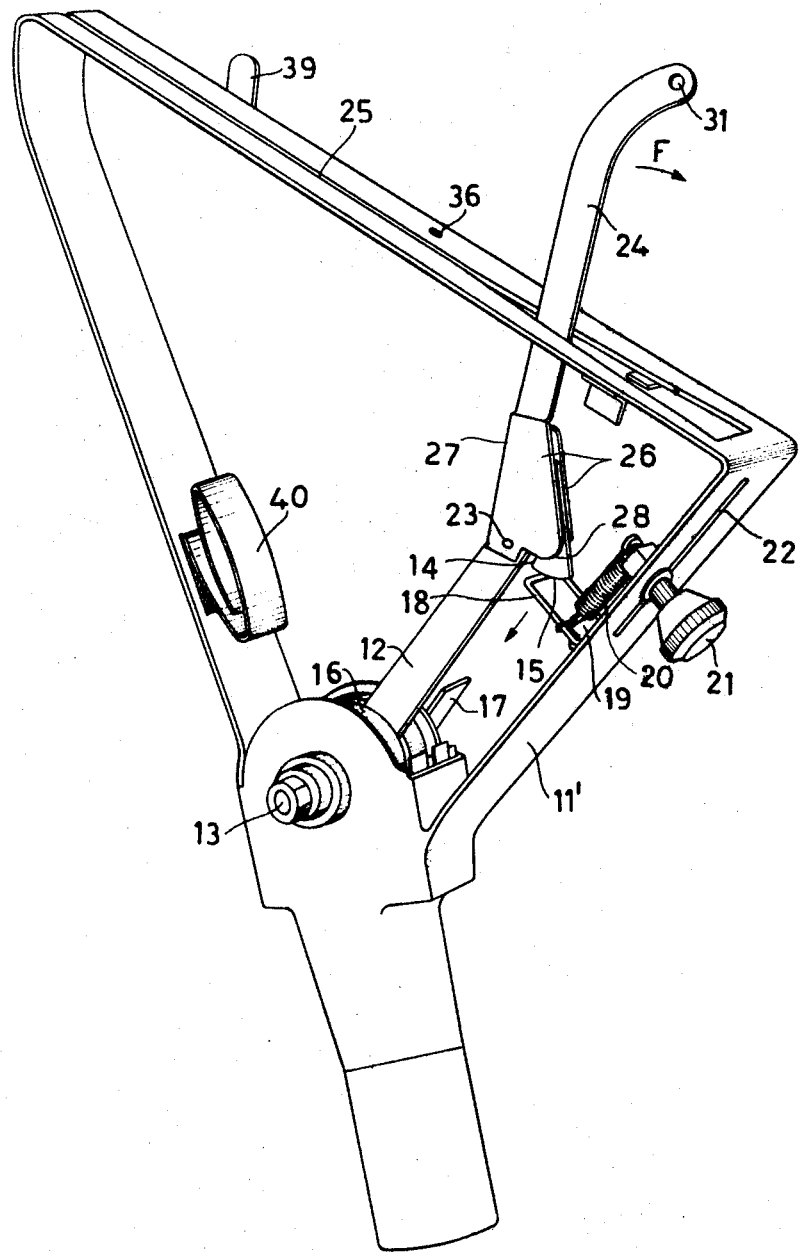

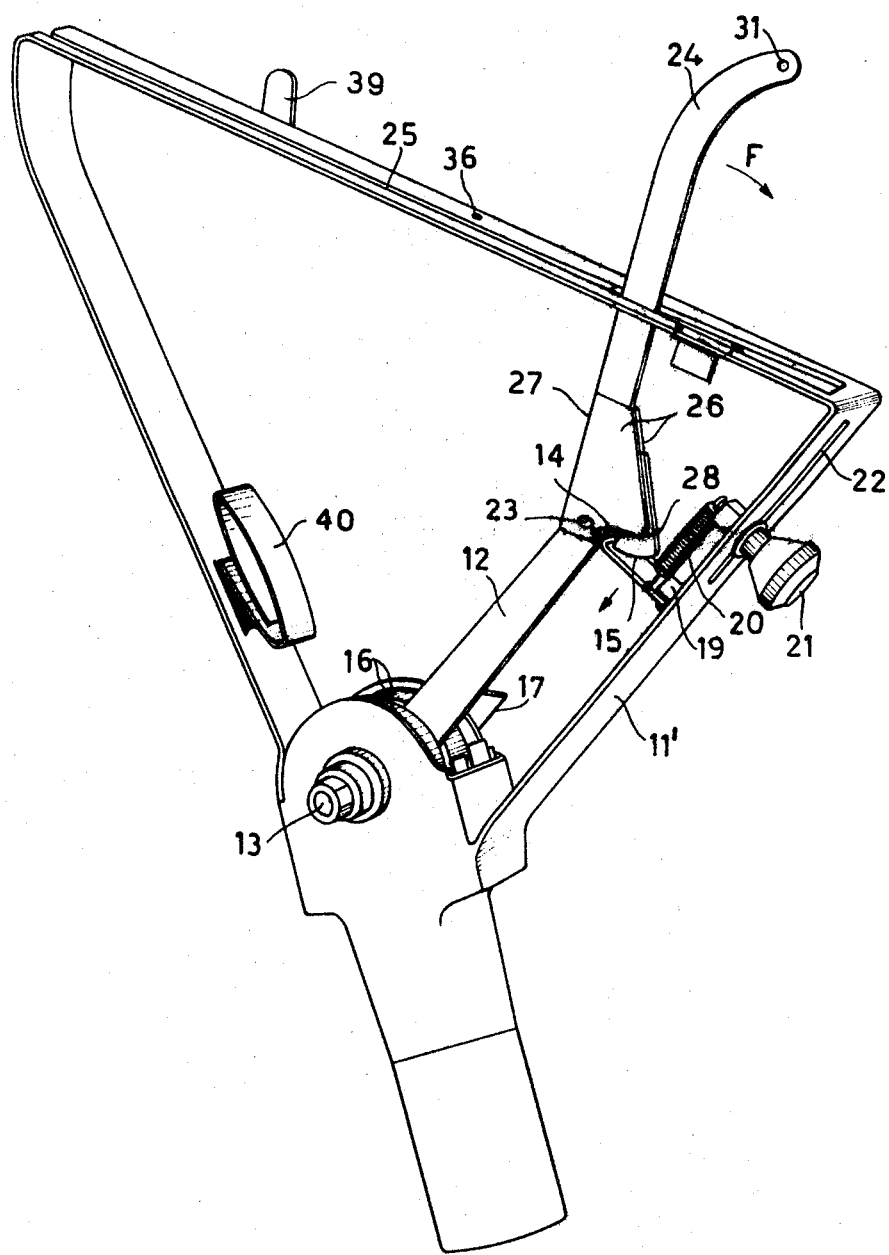

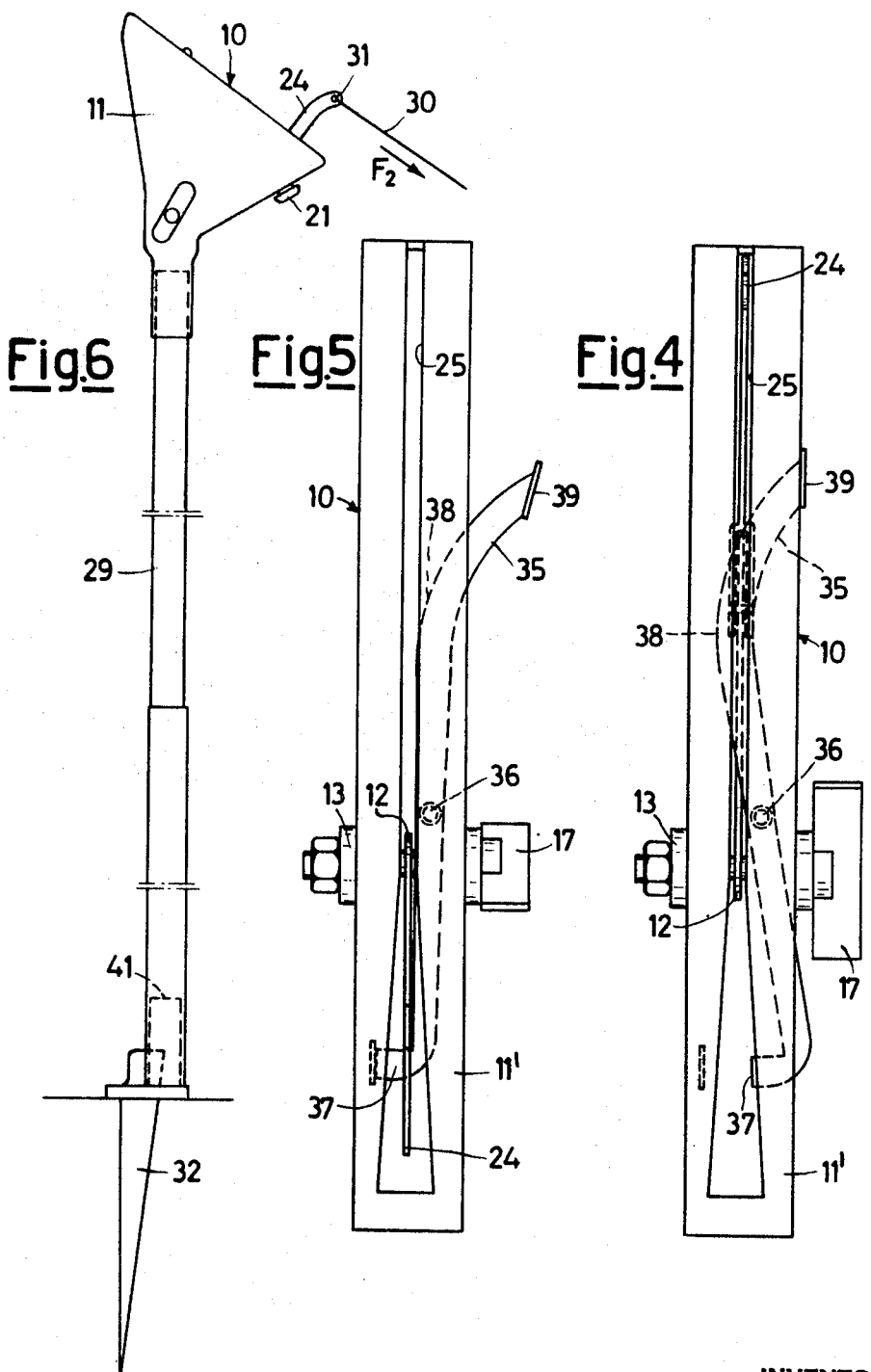

DEVICE FOR AUTOMATICALLY HOOKING A FISH

When fishing in deep waters, the angler should pay attention to the fishing rod tip, which is usually equipped with a bell, in order to be enabled to respond with a wrench to the fish which is about to nibble at the hook so as to hook it and to catch it.

In order that such a continuous and sometimes nerve-racking watch may be spared to the angler automatic snapping devices affixed to the fishing rod tip have been suggested, which cooperate with the rod and are adapted to cock the latter, by the agency of spring means, in a position in readiness for snapping and to latch it therein by the agency of latching means.

As a fish nibbles at the hook, it impresses a certain pull to the fishing line, which causes bending of the fishing rod, a bending which is enough to free the cocked rod from the latching means, causing the rod to snap in a direction away from the one of the pull so as to impart to said rod a jerk which is sufficient to hook the fish.

Devices of the kind referred to above have never proven successful inasmuch as, due to the flexibility and inertia of the rod, there is a comparatively significant delay between the instant of time when the fish imparts a pull to the fishing line and the wrench imparted to the rod tip, the result possibly being the escape of the fish.

Other automatic snapping devices have been suggested, which cooperate with the fishing line rather than the fishing rod, and these are cocked in a position in readiness for snapping and locked therein by latching means.

The fishing line is appropriately connected with the latching means and is also connected to the snap device by a loose twine section. Consequently, as the fish nibbles at the hook, the pull it imparts to the line clears the snapping device of the latching members, and the device will snap in a direction which is opposite to that of the pull and will impart a wrench to the fishing line through said loose twine section connected thereto.

These devices, too, have never given any satisfactory results inasmuch as the fishing line does not undergo the wrench directly at the point where it is fastened, that is, where the pull by the fish is experienced, but through a transfer member, so that, also in this case, there is a delay between the instant of time when the fish pulls the fishing line and the wrench undergone thereby.

An object of this invention is to do away with such a shortcoming by providing an automatic snapping device which is faster in action than those available on the market.

To this end, it has been envisaged to provide a device in which the end of the fishing line is directly fastened to a member which, when a certain pull is imparted to the fishing line, snaps in a direction opposite to that of the pull.

In order that the features of the subject invention may be better understood, a description will now be given, by way of example only and without limitation, reference being had to the accompanying drawings, wherein:

FIG. 2 is a perspective view of the device of FIG. 1 in a position in which it is almost cocked.

FIG. 3 is a perspective view of the device in its cocked position.

FIG. 4 is a plan view of the device, to illustrate the anti-snap safety device in its inoperative position.

FIG. 5 is a view similar to FIG. 4, but with the safety device is its operative position, and FIG. 6 is a diagrammatical view which shows the device in its operative position as mounted at the top of a telescopable tube driven into the ground.

Figure 1:
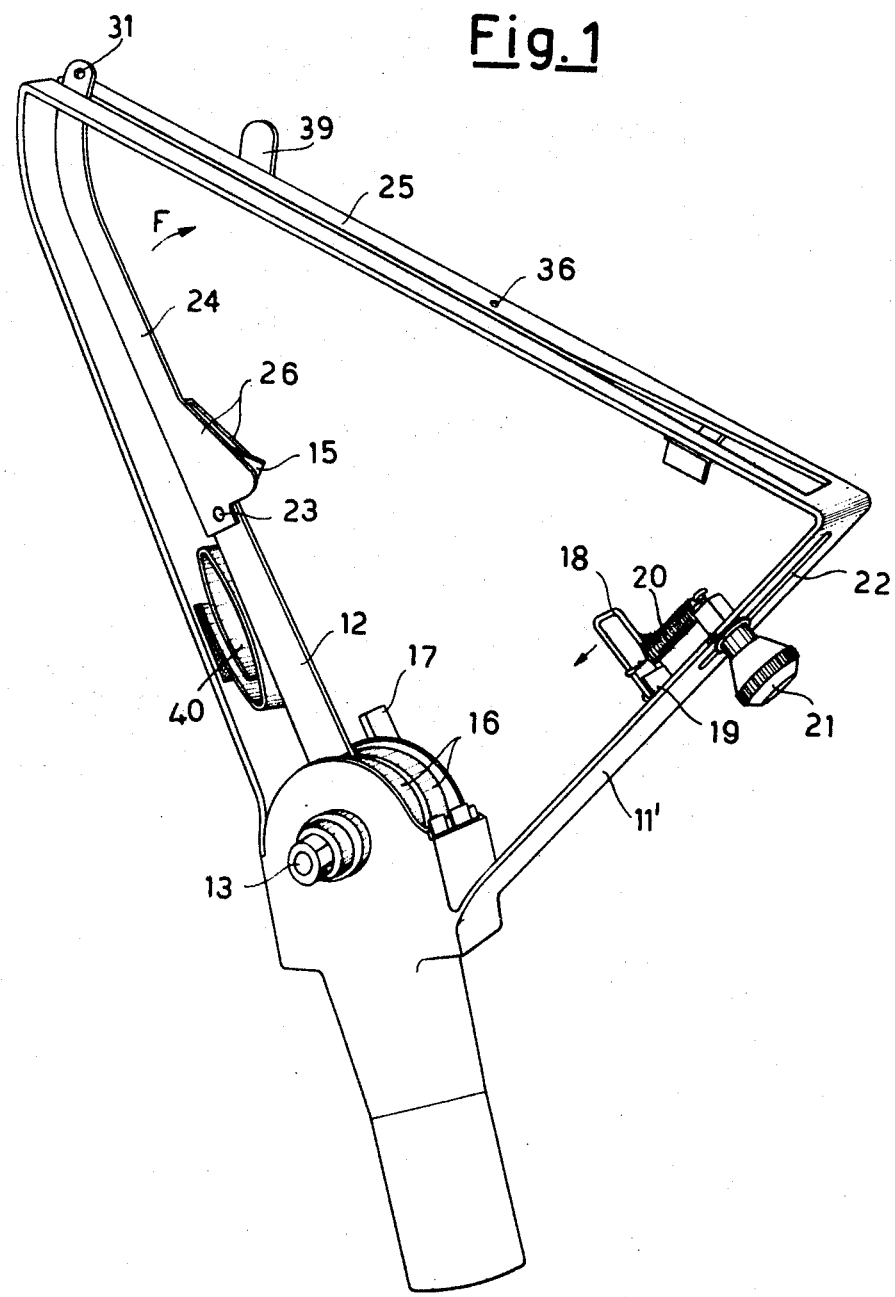
FIG. 1 is a perspective view of an automatic snapping device made according to the invention, shown in the idle position.

In the drawings, the numeral 10 generally indicates the device under discussion (FIG. 6) as contained in a casing 11, made of two pieces (not shown), preferably but not necessarily of a plastics material. With reference to FIGS. 1 to 3, the device comprises a rod 12 pivoted at one end to a pin 13 and having the opposite end in the shape of a hook 14 (FIG. 3) with an appropriate curved section 15.

Laterally of the rod 12 there are, inserted on the pin 13, two spiral springs 16 and having one end affixed to the rod 12 and the other end affixed to the frame 11' of the casing 11.

To the pin 13 there is affixed, in addition, a wing key 17 for controlling the rotation of the rod 12 from the position of FIG. 1 to the position of FIG. 3, said rotation winding up the springs 16, as will be understood, and cocking the rod 12 which is latched in its cocked position (FIG. 3) by the engagement of its hook-shaped end 14 with a substantially annular member 18 which is fastened to the frame 11' of the casing 11 in the following manner.

The member 18 is fastened to the frame 11' in a rotatable fashion against the bias of a spring 20, said spring keeping it against a stop 19 in the position of FIG. 1. The bias of the spring 20 can be adjusted by sliding the slider 21 along a slot 22 of the frame 11' for the purpose which will be explained hereinafter.

FIG. 2 shows that the engagement of the hook-shaped end 14 of the rod 12 with the member 18 takes place through the curved section 15 which, upon being advanced, acts upon the member 18 by rotating it downwards against the bias of the spring 20. As the curved section 15 passes over the member 18, the latter, as urged by the spring 20 (which is taut) snaps into the hook 14 (FIG. 3).

To the free end of the lever 12, there is pivoted, at 23, so as to oscillate in one direction only, an arm 24 whose free end emerges from the casing 11 through a longitudinal slot 25. The oscillation of the arm 24 in the direction of the arrow F with respect to the rod 12 is prevented by two confrontingly mounted ears 26 which are united on one side only by a wall 27 (FIGS. 2 and 3) and are open on the opposite side. The ears 26 straddle the free end of the lever 12 and are pivoted at 23 so that their wall 27, as the rod 12 rotates in the direction of the arrow F, abuts the edge thereof and locks the rod 12 to the arm 24.

The lower portion of each of the ears 26 has a cam profile 28 adapted to act upon the member 18 as will be explained hereinafter.

With reference to FIG. 6, the device 10 is usually mounted at the top of a telescopable tube 29 which is freely and rotatably installed on the pin 41 of a spade 32, the latter being driven into the ground. A fishing line 30 is fastened to the free end of the arm 24 which is bored at 31.

The operation of the device described above is the following.

The rod 12 with its hook 14 is cocked, in the manner as explained hereinabove, in the position of FIG. 3. As the fish is on the point of nibbling at the hook, it imparts a certain pull to the fishing line, in the direction of the arrow F. The arm 24, to which the fishing line is fastened, is immediately swung in the same direction, so that the cam profile 28 of the ears 26 acts on the member 18 (FIG. 3) causing the latter to be rotated against the bias of the spring 20 in the direction of the arrow thus clearing the hook 14, so that the cocked rod 12 will snap from the position of FIG. 3 to the position of FIG. 1 causing the arm 24 to snap therewith (connected thereto for rotation in this direction as aforesaid), so as to give a sudden jerk to the fishing line in a direction opposite to that of the pull imparted by the fish, thus facilitating the hooking of the latter, which can be caught.

Of course, the bias of the spring 20 acting upon the member 18 and counteracting the oscillation of the arm 24 in the direction of the arrow F, is adjusted as a function of the kind of fish one desires to catch. In addition, to prevent accidental snappings of the cocked device, for example during the possible connection thereof to the tip of a spinning rod, a safety latch is provided (FIGS. 4 and 5) which comprises a lever 35 pivoted at an intermediate point 36 of the frame 11' alongside the slot 25. The lever 35 is curvilinear and is rotatable between two positions, viz, a position where its tip 37 bent perpendicularly thereto lies across the slot 25 and prevents the swinging of the arm 24 in the direction of the arrow, and thus the snapping of the device, and a position where the end 37 is not disposed across the slot 25 which permits snapping. It will be noticed that when the snapping device is in the inoperative position and the safety lever 35 is in the second position aforesaid, the curved profile 38 of the lever 35 is in the slot 25 so that, as the device is cocked in the position of FIG. 3, the arm 24 runs in the slot 25 and acts upon said curved profile causing the lever 35 to be automatically rotated to said first position, that is, in a safety position in which the snapping of the device is prevented.

Of course, as the fishing line has been thrown and the device is correctly positioned, the safety device is disconnected by rotating the lever 35 to said second position by acting on a button 39 at the end away from the bent end 37. The numeral 40 indicates a leaf spring applied to the frame 11' of the casing 11 so as to absorb the shock of the rod 12 thereon.

The embodiments of the invention in which an exclusive property or privilege is claimed are defined as follows:

1. A device for automatically hooking a fish, comprising
a frame,
a rod pivoted at one end on said frame between a rest position and a cocked position,
an arm pivoted at one end to the other end of said rod and movable therewith to pivot said rod in one direction to its cocked position,
the free end of said arm being connectable to a fishing line,
means limiting the pivotal movement of said arm relative to said rod in the opposite direction, said arm in the cocked position of said rod being at its limit position in said opposite direction,
spring means opposing pivoting of said rod to cocked position and constantly urging said rod to its rest position,
means on said frame for releasably latching said rod in cocked position when said rod has been pivoted a predetermined distance in said one direction, and
means on said arm for disengaging said latching means from said rod when said arm is swung relative to said rod from its limit position in said one direction beyond said predetermined distance, whereby when said arm is moved in said one direction by a fish nibbling on the fishing line, said rod is released so that said spring means snaps said rod back toward its rest position.

2. A device as claimed in claim 1, wherein said latching means comprises a catch on said frame and a hook on said rod engageable with said catch.

3. A device as claimed in claim 2, wherein said catch is pivoted on said frame, a spring connects said catch to said frame and constantly urges said catch to operative position, and said arm has a cam on it which, when said arm is swung in said one direction beyond said predetermined distance, disengages said catch from said hook.

4. A device as claimed in claim 3, having means on said frame for adjusting the tension of said spring to adjust the force to be overcome to release said rod.

5. A device as claimed in claim 2, having a safety latch mounted on said frame to lock said arm with said rod in cocked position.

6. A device as claimed in claim 5 wherein said frame has a slot in it, said arm moves in said slot between rest and cocked positions, said safety latch is a longitudinally curved arm and is pivoted intermediate its ends on said frame and disposed so as to overlie said slot when said arm is in rest position so that when said arm is moved in said slot to cocked position said safety latch is swung about its pivot to move it automatically to locking position.

7. A device as claimed in claim 6, wherein a button is provided at one end of said safety latch for moving it manually to inoperative position.

* * * * *